United States Patent
Machat et al.

[11] 3,926,677
[45] Dec. 16, 1975

[54] ELECTRIC PRIMARY CELLS

[75] Inventors: Jean-Yves Machat, Grenoble; Jean-Claude Sohm, La Tronche, both of France

[73] Assignee: Anvar, Agence National de Vaolirsation de la Recherche, Neuilly-sur-Seine, France

[22] Filed: Oct. 11, 1974

[21] Appl. No.: 514,167

Related U.S. Application Data

[63] Continuation-in-part of Ser. No. 333,322, Feb. 6, 1973, abandoned.

[30] Foreign Application Priority Data
Feb. 25, 1972 France ............................ 72.06464

[52] U.S. Cl. .............................. 136/107; 136/155
[51] Int. Cl.² ........................................ H01M 21/00
[58] Field of Search .................... 136/107, 102, 155

[56] References Cited
UNITED STATES PATENTS

| | | | |
|---|---|---|---|
| 1,425,163 | 8/1922 | Bardt | 136/155 |
| 2,650,945 | 9/1953 | Herbert | 136/107 X |
| 3,219,487 | 11/1965 | Krouse et al. | 136/107 |
| 3,392,057 | 7/1968 | Sakagami et al. | 136/107 X |
| 3,450,569 | 6/1969 | Dumas et al. | 136/155 X |
| 3,679,488 | 7/1972 | Dalard et al. | 136/155 X |
| 3,701,688 | 10/1972 | Gabano et al. | 136/155 X |

*Primary Examiner*—John H. Mack
*Assistant Examiner*—C. F. Lefevour
*Attorney, Agent, or Firm*—Dowell & Dowell

[57] ABSTRACT

A primary cell comprising a non-pulverulent substantially pure zinc anode, a mass of mercuric oxide forming a depolarizer, an uncorrodible cathode, and an electrolyte formed of zinc perchlorate $Zn(ClO_4)_2$ without any organic gel or other corrosion inhibitor. This electrolyte preferably also includes zinc oxide or zinc hydroxide which adjusts the pH of the electrolyte to the optimum level necessary to minimize corrosion of the zinc anode and therefore virtually stop the evolvement of gas, whereby the cell can be sealed gas-tight.

4 Claims, 3 Drawing Figures

ELECTRIC PRIMARY CELLS

This application is a continuation-in-part of our co-pending application Ser. No. 333,322, filed Feb. 16, 1973 and having the same title.

BACKGROUND AND PRIOR ART

This invention relates to primary electric cells comprising a substantially pure zinc anode, an uncorrodible cathode and a solid depolarizing mass of mercuric oxide HgO.

In the known so-called "mercury" cells of this type the electrolyte is generally an aqueous solution of potassium hydroxide KOH. These cells have the advantage that their electromotive force is substantially constant during their whole useful life, while in the case of the conventional Leclanche cells wherein the depolarizer is manganese dioxide and the electrolyte is ammonium chloride, the electromotive force decreases progressively in use. These so-called mercury cells are commonly used more particularly in electric measuring apparatus and in electric watches. Their disadvantage is however that they cannot be sealed in an absolutely gas-tight manner owing to a slight evolution of gas resulting from a minor corrosion of the zinc anode. This results in a progressive evaporation of water from the electrolyte solution and also in the formation of salt crusts on the outer surface of the cell, more particularly on the metallic parts which form the terminals thereof, thus causing defective contacts. Another difficulty is that owing to the reduced reactivity of the electrolyte, the zinc anode usually must be in the form of a powder generally applied against a conducting surface of nickel-plated steel.

THE INVENTION

An object of the present invention is to provide a primary cell of the mercuric oxide type wherein any substantial evolution of gas is eliminated.

Another object of this invention is to provide a primary cell of the mercuric oxide type which can be sealed in an absolutely gas-tight manner.

Still a further object of this invention is to provide a cell of the character above referred to in which the zinc anode may be included in a non-pulverulent form, such as a can or a disc, thus reducing the cost and the dimensions of the cell.

According to the present invention in a primary electric cell in which mercuric oxide is used as a depolarizer in combination with a substantially pure zinc anode and an uncorrodible cathode, the electrolyte is formed of an aqueous solution of zinc perchlorate $Zn(ClO_4)_2$.

Tests have demonstrated that aqueous solutions of zinc perchlorate are practically non-corrosive for a zinc anode, provided, however, that the pH of the solution is properly selected. Any possible gas evolution can in this way be made quite negligible. This non-corrosive character of zinc perchlorate may be enhanced by adding to the electrolyte the proper amount of zinc ozide (ZnO) or zinc hydroxide $Zn(OH)_2$ required to adjust the pH of the solution to an optimum level.

A principal advantage of the cell according to the present invention is that its voltage remains constant within one millivolt, even when the cell has been at rest for a long period of time.

Figure 1:
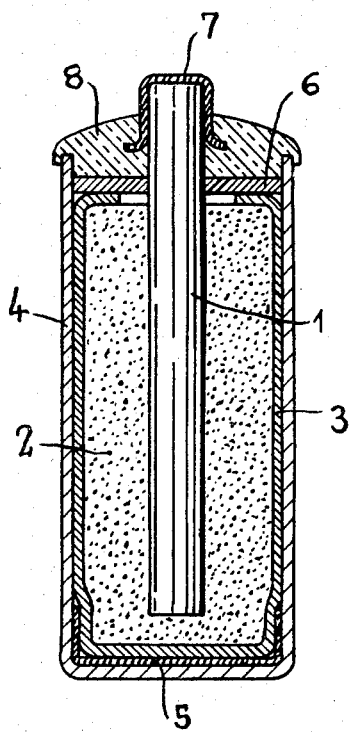
FIG. 1 is an axial section taken through a cell according to the present invention.

The primary cell illustrated in FIG. 1 comprises a carbon rod 1 adapted to form an uncorrodible cathode, a cylindrical mass 2 of mercuric oxide containing carbon black which surrounds rod 1, a separating paper 3 disposed around mass 2, and a zinc can 4 which is in direct contact with paper 3 without any intermediate layer of zinc powder or of an organic gel. The zinc can is not alloyed, but consists of substantially (commercially) pure zinc. The flat bottom of the zinc can 4 is covered by a protective insulating disc made of cardboard and its open upper end receives another insulating disc 6 which has an opening to permit the passage of the upper end of rod 1, this end carrying a copper cap 7. Disc 6 is covered by a pitch plug 8 in which cap 7 is in part embedded, this plug thus forming a gas-tight seal for the zinc can in spite of the porous character of rod 1.

The separating paper 3 and the mercuric oxide mass 2 are impregnated with an aqueous solution of zinc perchlorate $Zn(ClO_4)_2$ which preferably contains sufficient zinc oxide (ZnO) or zinc hydroxide $Zn(OH)_2$ to adjust its pH to a value for which the non-corrosive effect with respect to the zinc anode is optimized.

The pH of the zinc perchlorate solution prior to adding zinc hydroxide is about 4 to 6. This range is too low, because the pH of a zinc perchlorate solution should be in the range of 5 to 6 in order to minimize the corrosive effect thereof on the zinc anode, and thereby minimize gas evolvement so that the cell can be successfully sealed gas-tight. Therefore, zinc hydroxide is added to raise the pH of the solution, and a pH of 5.5 is considered optimum for this purpose. Other electrolytes have been tried, such as magnesium perchlorate, but the pH of such a solution is of the order of 8–9 and is already too high, with the result that the corrosive effect thereof on the anode is excessive and evolves so much gas that the cell can not be sealed. Moreover, the voltage stability of a cell using magnesium perchlorate as the electrolyte with an anode made of substantially pure zinc is less than that of a cell using zinc perchlorate with a zinc anode. Zinc perchlorate and magnesium perchlorate exhibit different chemical and electrochemical properties, particularly in primary batteries with a pure zinc anode. More precisely, $Zn(OH)_2$ percipitates from an alcalinized solution of $Zn(ClO_4)_2$ when the pH reaches 5 to 6, while $Mg(OH)_2$ percipitates from an alcalinized solution of $Mg(ClO_4)_2$ when the pH reaches 8 to 9. This results in primary batteries having a pH of 5–6 in the first case and a pH of 8–9 in the second case.

The involved electrochemical system is $Zn/Zn^{2+}$ at pH = 5–6 and $Zn/Zn(OH)_2$ at pH = 8–9. Tests show that the voltage of a battery made using zinc perchlorate remains constant within 1 millivolt, while the voltage of the magnesium perchlorate battery fluctuates randomly within several tens of millivolts. Consequently $Zn/Zn^{2+}$ produces results improved by a whole order of magnitude.

The depolarizer mass 2 has preferably the following composition by weight:

| | |
|---|---|
| Mercuric oxide HgO | 60 parts |
| Divided carbon in the form of gas black preferably mixed with graphite | 8 parts |
| Zinc oxide ZnO | 2 parts |
| Aqueous solution of zinc perchlorate Zn (ClO$_4$)$_2$ at a density of about 1.25 | 20 parts |

Note that in the above example the zinc oxide may be replaced by an equivalent quantity of zinc hydroxide, namely substantially 2.4 parts by weight.

The zinc can 4 need not be amalgamated, and it has not to be protected by an organic gel. Paper 3 should only have a sufficient absorbing power to retain the required quantity of electrolyte.

Experience shows that owing to the use of zinc perchlorate containing the proper amount of zinc oxide or zinc hydroxide, the evolution of gases from the cell can be made quite negligible. It is thus possible to seal this cell in an absolutely gas-tight manner as described, thus avoiding the formation of salt crusts on the outer surface of the cell and more particularly on its terminals.

The advantages of the present cell over the cell according to our prior copending application Ser. No. 392,090, filed Aug. 27, 1973 wherein the electrolyte is magnesium perchlorate are;

1. a more complete elimination of any evolution of gas; and
2. a considerably more constant voltage.

The second advantage is by far the more important since in the previous cell gas evolution was already quite small. In this respect it is to be remembered that in the past mercury cells have been mainly used:

either with small portable sets, as for instance, those known as "audiophones" for persons hard of hearing;

or as a source of constant voltage in electric measuring apparatus such as ohmmeters.

The cell according to the above referenced prior application was quite satisfactory for the first application, but its somewhat fluctuating voltage introduced an excessive error in measuring apparatus of normal precision.

Comparing the cell of FIG. 1 with the conventional Leclanche cell as commonly found in the trade, the following differences may be noted:

1. The depolarizer is mercuric oxide instead of manganese dioxide, which wholly changes the operating characteristics of the cell.
2. The electrolyte is an aqueous solution of zinc perchlorate and not of zinc and ammonium chloride.
3. The separating paper is not impregnated with an organic gel.
4. The zinc anode is unamalgamated in the present cell.
5. The present cell is sealed in an absolutely gas-tight manner.

With respect to the usual mercury cell the differences are:

1. The aqueous electrolyte is formed of zinc perchlorate and not of potassium hydroxide.
2. No layer of zinc powder is provided between the inner surface of the can or container and the separating paper.
3. The can or container is of zinc and not of nickel-plated steel.
4. The cell is sealed in an absolutely gas-tight manner.

Figure 2:
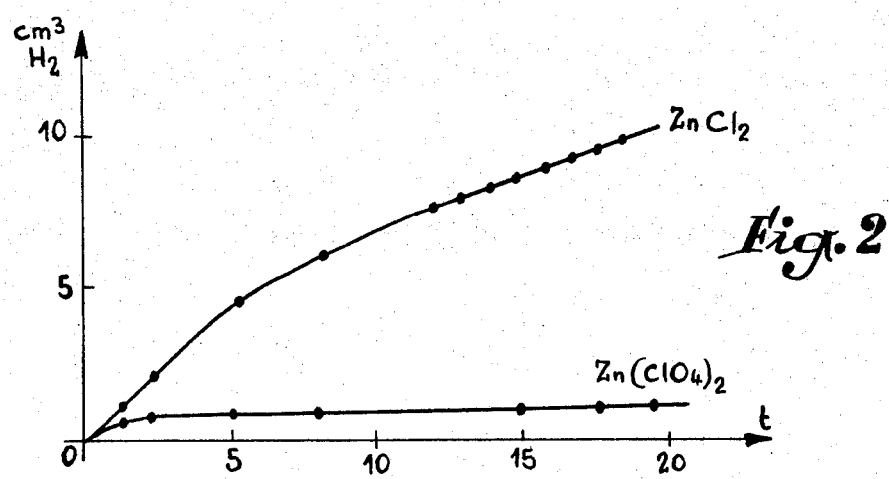
FIG. 2 is a diagram illustrating the corrosion of a zinc can respectively in zinc chloride and in zinc perchlorate.

The curves of FIG. 2 illustrate the corrosion of a zinc can at 60° C respectively in a solution of zinc chloride and in a solution of zinc perchlorate. The ordinates correspond to the quantities of evolved H$_2$ in cm$^3$, while the abscissae represent the time in days. In the case of ZnCl$_2$ the corrosion rate decreases very slightly after about five days, but it does not stop, the quantity of gas evolved increasing with time. However with Zn(ClO$_4$)$_2$ this quantity remains practically unchanged after about two days. The very small amount of gas evolved is practically negligible, and in any case it may be taken into account by only sealing the cells some days after they are mounted.

Figure 3:
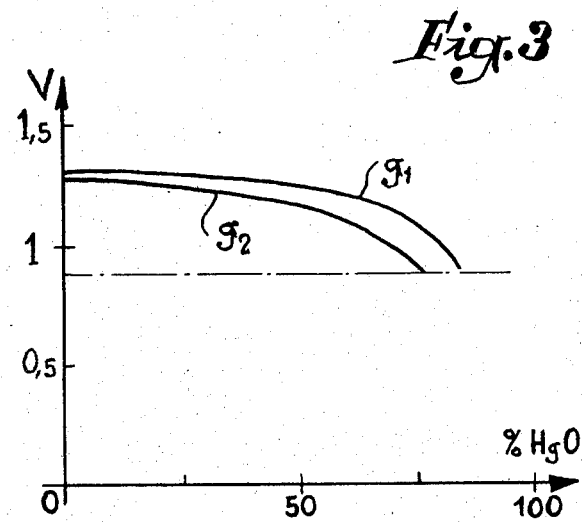
FIG. 3 is a diagram showing the variation of the electromotive force of a cell as illustrated in FIG. 1 respectively with a load of 50 and 20 ohms.

FIG. 3 illustrates the operation of the cell of FIG. 1 under two different loads namely 50 ohms (curve g1) and 20 ohms (curve g2). The ordinates are in volts and the abscissae in percentages of HgO consumed, i.e. transformed into Hg metal. The curves are admittedly not perfectly horizontal in their main portions, but the difference is small and it may be noted that it decreases as the load resistance increases, which is an advantage since mercuric oxide cells are generally used with circuits of quite high ohmic resistance, as for instance 100,000 ohms or more in ohmmeters. It will also be seen that when the discharge is stopped at 0.9 volt, the depolarizer has been used to more than 75%.

While the invention has been described with reference to an elongated cylindrical cell in which the components are disposed co-axially to each other, it is obvious that it could also be applied to flat cells in which the components are in the form of superposed discs.

We claim:

1. A primary electric cell which can be fully sealed because of negligible quantity of gas evolved, comprising:
   a. a solid anode consisting essentially of zinc;
   b. an uncorrodible cathode;
   c. a paper separator in direct contact with the zinc anode;
   d. a depolarizor of mercuric oxide and carbon black operatively associated with said cathode;
   e. an electrolyte interposed between the cathode and the paper separator and in direct contact with the paper, the electrolyte consisting essentially of an aqueous solution of zinc perchlorate containing zinc oxide or zinc hydroxide in quantity sufficient to minimize the corrosive effect on the anode of the electrolyte; and
   f. means for sealing the cell gas-tight.

2. The cell as set forth in claim 1, wherein the depolarizor and electrolyte comprise by weight, approximately:
   60 parts mercuric oxide;
   20 parts aqueous solution of zinc perchlorate;
   8 parts carbon black; and
   2 parts zinc oxide.

3. The cell as set forth in claim 1, wherein the depolarizor and electrolyte comprise by weight, approximately:
   60 parts mercuric oxide;
   20 parts aqueous solution of zinc perchlorate;
   8 parts carbon black; and
   2.4 parts zinc hydroxide.

4. The cell as set forth in claim 1, wherein the quantity of zinc oxide or zinc hydroxide included in the electrolyte is sufficient to adjust the pH of the electrolyte to about 5.5.

* * * * *